(12) United States Patent
Norris et al.

(10) Patent No.: US 10,562,780 B2
(45) Date of Patent: Feb. 18, 2020

(54) RUBBER PROCESSING METHOD

(71) Applicant: Avon Polymer Products Ltd, Melksham, Wiltshire (GB)

(72) Inventors: Christopher Norris, Melksham (GB); Martyn Bennett, Melksham (GB)

(73) Assignee: Avon Polymer Products LTD, Wiltshire (GB)

( * ) Notice: Subject to any disclaimer, the term of this patent is extended or adjusted under 35 U.S.C. 154(b) by 434 days.

(21) Appl. No.: 15/304,837

(22) PCT Filed: Apr. 13, 2015

(86) PCT No.: PCT/GB2015/051112
§ 371 (c)(1),
(2) Date: Oct. 17, 2016

(87) PCT Pub. No.: WO2015/159054
PCT Pub. Date: Oct. 22, 2015

(65) Prior Publication Data
US 2017/0217778 A1   Aug. 3, 2017

(30) Foreign Application Priority Data
Apr. 17, 2014   (GB) .................................. 1406975.1

(51) Int. Cl.
| | |
|---|---|
| *B29B 17/00* | (2006.01) |
| *C01B 33/12* | (2006.01) |
| *C08K 3/36* | (2006.01) |
| *B60C 1/00* | (2006.01) |
| *B09B 3/00* | (2006.01) |

(52) U.S. Cl.
CPC ............ *C01B 33/12* (2013.01); *B09B 3/0083* (2013.01); *B29B 17/00* (2013.01); *B60C 1/0016* (2013.01); *C08K 3/36* (2013.01)

(58) Field of Classification Search
CPC ........ C01B 33/12; B09B 3/0083; B29B 17/00
USPC ....................................................... 524/571
See application file for complete search history.

(56) References Cited

U.S. PATENT DOCUMENTS

| | | |
|---|---|---|
| 4,435,378 A | 3/1984 | Reck et al. |
| 5,129,995 A | 7/1992 | Agarwal |
| 5,198,018 A | 3/1993 | Agarwal |

FOREIGN PATENT DOCUMENTS

| | | | |
|---|---|---|---|
| CN | 103130230 A | * | 6/2013 |
| CN | 103130230 A | | 6/2013 |
| EP | 0723991 A1 | | 7/1996 |
| WO | WO2005/081356 A1 | | 9/2005 |

OTHER PUBLICATIONS

Suuberg, et al., Porosity development in carbons derived from scrap automobile tires, Carbon 45 (2007) 1719-1726.
Quek, et al., Preparation and characterization of low energy post-pyrolysis oxygenated tire char, Chemical Engineering Journal 170 (2011) 194-201.
Lee, et al., Pyrolysis of Waste Tires With Partial Oxidation in a Fluidized-Bed Reactor, Energy 1995, vol. 20, No. 10, pp. 969-976.
Ansarifar, et al., Optimising the chemical bonding between silanised silica nanofiller and natural rubber and assessing its effects on tehproperties of the rubber, International Journal of Adhesion & Adhesives, 26 (2006) pp. 454-463.
Ansarifar, et al., Reinforcement of Natural Rubber with Silanized Precipitated Silica nanofiller, Rubber Chemistry and Technology, vol. 78, No. 5 (Nov. 2005), pp. 793-805.

* cited by examiner

*Primary Examiner* — Kelechi C Egwim
(74) *Attorney, Agent, or Firm* — Stites & Harbison PLLC; Richard S. Myers, Jr.

(57) ABSTRACT

The present invention relates to methods for removing carbon from a char product that is formed by heating a silica-containing rubber compound in an inert atmosphere or under vacuum. The method includes heating the char product in an oxidising atmosphere to remove the carbon material leaving a silica-containing product. The methods are particularly applicable to vehicle tyre rubber compositions. Silica-containing products obtained by these methods and rubber compositions incorporating such silica-containing products are also aspects of the invention.

10 Claims, 11 Drawing Sheets

RUBBER PROCESSING METHOD

CROSS REFERENCE TO RELATED APPLICATIONS

This application is a § 371 National State Application of PCT/GB2015/051112 filed Apr. 13, 2015 which claims priority to GB 1406975.1 filed Apr. 17, 2014.

TECHNICAL FIELD

The present proposals relate to the processing of rubber compositions and in particular vehicle tyre compositions to recover components from the compositions. In particular the proposals relate to methods of processing and the materials recovered by such methods.

BACKGROUND

Disposal of waste vehicle tyres and tyre compositions present a significant challenge. Large numbers of waste tyres are simply sent to landfill sites. Alongside the environmental impact of discarding significant amounts of non-biodegradable material in landfill sites, this approach also presents a risk of accidental fires with the associated high pollutant emissions.

Traditional tyre compounds contain significant amounts of carbon black as a reinforcing agent. It is known to process these used tyres using a pyrolysis method, i.e. heating under an inert atmosphere. This pyrolysis releases gaseous products, that can be reclaimed and recycled in some cases, and also oils and liquid organic components that can also be recycled to some degree. The product is typically called "char" and is the remaining solid non-volatile components. This "char" contains a large proportion of carbon black, carbonaceous residues formed during polymer decomposition and an ash component comprising other non-volatile parts of the original tyre composition. The carbonaceous residues form on the surfaces of the originally compounded carbon black and inorganic particles, essentially fusing together large agglomerates. The carbonaceous residues reduce surface activity and dispersability of the pyrolysis carbon black, both of which have a negative impact on reinforcement. It is known in some cases to subject char to a further processing step to convert it into more valuable products such as activated carbon and porous carbon. For example Suuberg & Aarna (Carbon, 45 (2007) 1719-1726 describe a process for producing porous carbon materials from scrap automotive tyres using an oxidation process. Quek & Balasubramanian, Chemical Engineering Journal 170 (2011) 194-201 describe a post-pyrolysis oxidation process for enhancing absorption characteristics of pyrolytic char. U.S. Pat. No. 4,435,378 describes a process for removing extractable substances from carbon black using an oxidising gas treatment.

It is also known to treat waster tyres under partially oxidising pyrolysis conditions in a fluidised bed reactor to produce useful gaseous products (Lee et al. Energy, 20(10), 969-976 (1995).

However, it remains desirable to provide a method for recovering silica-containing material with a very low or zero carbon content from silica-containing rubber compositions.

SUMMARY

In general the present proposals relate to methods for removing carbon from a char product formed by heating a silica-containing rubber compound in an inert atmosphere or under vacuum. The general procedure involves heating the char product in an oxidising atmosphere to remove carbon material from it to give a silica-containing product.

These methods are useful for recovering a silica-containing product from silica-containing rubber compounds, in particular silica-containing vehicle tyre compositions and vehicle tyres themselves. In these cases, the general procedure includes initial steps of heating the silica-containing rubber compound in an inert atmosphere or under vacuum to give a char product; and subsequently heating the char product in an oxidising atmosphere to remove carbon material from it to give the silica-containing product.

This step of heating in an oxidising atmosphere is to remove carbon (and other combustible materials) from the composition to recover the silica-containing product.

These proposals also relate to the silica-containing product itself that has been recovered from a silica-containing rubber composition. This recovered silica product typically has properties similar to commercial non-reclaimed silica and may behave in a very similar way to this non-reclaimed silica in rubber compositions into which it is incorporated.

These proposals also relate to rubber compositions, e.g. vehicle tyre rubber compositions and vehicle tyres formed from these compositions which include silica recovered by the methods of the present proposals.

These proposals also relate to a method of recovering silica from the char product obtained when a silica-containing rubber composition is heated in an inert atmosphere.

BRIEF DESCRIPTION OF THE FIGURES

FIGS. 11-13 show the cure and dynamic properties of each of the rubber compositions (without silane component) incorporating the silica-containing product reclaimed from each of the tyre compositions A-F.

FIGS. 15-17 show the cure and dynamic properties of each of the rubber compositions (including 4phr silane) incorporating the silica-containing product reclaimed from each of the tyre compositions A-F.

DETAILED DESCRIPTION

The methods of the present proposals include the step of heating a char composition in an oxidising atmosphere. Some of the methods also include an earlier step of heating a silica-containing rubber composition in an inert atmosphere or under vacuum to give a char product.

The step of heating in an inert atmosphere i.e. "pyrolysis" is known in the processing and recycling of rubber compositions, especially rubber derived from vehicle tyres. During this pyrolysis step the base polymer rubber compounds are broken down and some of these breakdown components are removed both as volatile gasses and/or as liquid components, e.g. liquid hydrocarbons, oils etc. These gasses and liquid components may in themselves be retained or recycled. The product remaining after pyrolysis is known as "char".

In the present methods where the feedstock is a silica-containing rubber composition, this char component comprises silica and typically also other non-volatile components. In particular this char comprises (alongside silica) solid carbon-based components such as carbon black and other minor inorganic additives (such as zinc oxide) from the original rubber composition. As noted above, further components of the char product are the polymer breakdown products. These carbonaceous residues form on the surfaces of the originally compounded carbon black and inorganic particles, essentially fusing together large agglomerates. The carbonaceous residues reduce surface activity and dispersability of the pyrolysis carbon black, both of which have a negative impact on reinforcement. So, a significant advantage of the present methods is the ability to remove the polymer breakdown products from the char. This typically results in a more dispersible product that can be more easily incorporated into a new rubber composition.

The pyrolysis is typically carried out in an inert atmosphere or under vacuum. Preferably the inert atmosphere is selected from nitrogen, helium, argon or any other inert gas. The pyrolysis step is typically performed at a temperature of between about 300° C. and about 800° C., preferably between about 400° C. and 700° C., more preferably between about 500° C. and 600° C., most preferably around 550° C. The pyrolysis step is performed for sufficient time for the volatile gasses and liquid components to be removed from the rubber composition, e.g. until these components are no longer given off from the composition. For example the pyrolysis step may typically be performed for about 6 to 12 hours. The atmosphere, temperature, time and other conditions of the pyrolysis step are presented as typical parameters. However the pyrolysis step is known for rubber compositions derived from vehicle tyres so the parameters required for this pyrolysis step may be easily determined by a skilled person.

The pyrolysis step is followed by an oxidation step in which the char product from the pyrolysis is heated in an oxidising atmosphere. This oxidation step oxidises at least the carbon materials in the char and gasifies them for removal as gaseous carbon dioxide and/or carbon monoxide. This removal of the carbon-based materials from the char product leaves only the desired silica material along with some other inorganic components. In typical cases all or substantially all of the organic-based materials are removed from the char, e.g. 95 wt. % of the carbon materials are removed from the char product, preferably at least 98 wt. %, more preferably at least 99 wt. %, most preferably at least 99.5 wt. %. In most preferred aspects the carbon material is removed entirely. It is especially preferred that the carbon products from the breakdown of the polymer component of the rubber compounds in the composition are removed entirely, i.e. 100 wt. % removed (or at least 95 wt. %, preferably at least 98 wt. %, preferably at least 99 wt. %, preferably at least 99.5 wt. %) from the char product by this oxidation step. The removal of the carbon material from the char product represents a significant improvement over known methods and allows recovery of high quality silica-containing material which behaves, in terms of incorporation into new rubber compositions, in a very similar manner to non-reclaimed silica. The use of an oxidation step in the methods of the present proposals provides this ability to recover silica-containing material from silica-containing rubber compositions (e.g. vehicle tyres) and to obtain a high enough quality product that it can be re-used in new rubber compositions, in particular new vehicle tyre compositions without significant loss of performance in the new compositions.

Where comparisons are made with "non-reclaimed" silica, this refers to untreated silica that has not been recovered from silica-containing rubber compositions. Typically this is a commercially available product.

The methods of the present proposals may also comprise further optional steps. The methods optionally include a densification step following the oxidation of the char material. In this densification step the silica product resulting from the oxidation stage (preferably following cooling to room temperature) is compacted or increased in density. For example the reclaimed silica-containing product may be subjected to a compressive force to increase the density of the product. Alternatively, tumbling the silica-containing product particles in a silo causes surface charges to build up; such charges draw the particles together to form weak agglomerates. Typically the silica-containing material obtained from the oxidation step is a low density "fluffy" product which may increase the challenges associated with handling and shipping the product. Therefore the inclusion of a densification step following the oxidation may provide a material that behaves more like non-reclaimed silica compared to the raw product following oxidation, i.e. without densification.

The present methods may also include an optional step following the oxidation stage (and densification if performed) of incorporating the silica-containing product into a rubber composition, preferably a vehicle tyre rubber composition, and optionally a further step of moulding this rubber composition into a product such as a vehicle tyre. Where this step of incorporating the silica product into a vehicle tyre rubber composition is included, the tyre rubber compound is preferably a standard rubber compound and the silica product is preferably incorporated in a standard amount, e.g. about 40-80, e.g. about 50-70, such as about 60 parts by weight per 100 parts by weight of base rubber component.

Other optional steps such as grinding, sieving or granulation may also be incorporated following the oxidation step to further modify the particle size and/or density of the reclaimed silica-containing product.

The present methods also optionally include initial additional steps (prior to the pyrolysis stage) of preparing the rubber compositions for pyrolysis treatment. These steps may include initial processing of vehicle tyres (e.g. removal of cords, wires, valves etc.) and dividing the rubber component of the tyres into small chips or shreds for processing, e.g. chips approximately 5-10 mm in diameter or shreds of around 50 mm. These initial preparation stages are typically known in the art.

The temperature at which the oxidation step is performed is important because it needs to be sufficient to remove the unwanted impurities (e.g. carbon-based materials, particularly the carbon-based polymer decomposition products resulting from the pyrolysis process) from the char material but not too high so as to damage or impair the silica product. Preferably the temperature at which the oxidation step is performed is between about 300° C. and about 1600° C. Below about 300° C. the unwanted impurities (e.g. carbon-based materials) are either not removed at all or are removed only very slowly so the method becomes impractical. Above about 1600° C. the silica product is damaged (the melting point of silica is typically between about 1600° C. and 1725° C.). Preferably the temperature at which the oxidation process is performed is greater than 300° C. and is preferably greater than 400° C., or 450° C., or 500° C., or 600° C., or 700° C. In some cases the temperature at which the oxidation step is performed is less than 1600° C., preferably less than 1500° C., or 1400° C., or 1300° C., or 1200° C., or 1100° C., or 1000° C., or 900° C., or 800° C., or 700° C. In some preferred cases the oxidation process is performed at a temperature in the range between about 400° C. and 1000° C., preferably between about 500° C. and 800° C., e.g. between about 500° C. and 700° C., preferably between 550° C. and 650° C., e.g. around 600° C.

The oxidation step is performed for sufficient time to oxidise and remove the unwanted impurities from the char product, e.g. the carbon-based impurities, particularly the carbon-based polymer decomposition products resulting from the pyrolysis process. Typically this oxidation step involves heating the char material as described above for a time period of at least 15 minutes, although shorter times such as 5 or 10 minutes may be effective if highly oxidising atmospheres are used or at high temperatures. If the oxidation step is performed for a shorter time period, in many cases the unwanted impurities (e.g. carbon-based impurities) are not sufficiently removed from the char product so the silica product remaining at the end of the oxidation procedure is contaminated with unwanted impurities. The oxidation step is typically performed for a time period less than 10 hours. Beyond about 10 hours no further significant improvement in the quality of the silica product is achieved so it is economically undesirable to continue the heating process without further benefit in the resultant product. In preferred aspects the oxidation step is performed for a time period of at least 15 minutes, or at least 30 minutes, or at least 45 minutes. In preferred aspects the oxidation step is performed for a time period of less than 10 hours, or less than 6 hours, or less than 5 hours, or less than 4 hours, or less than 3 hours, or less than 2 hours or less than 90 minutes. In some preferred aspects the oxidation period is performed for a time period of between about 15 minutes and 6 hours, or between 15 minutes and 3 hours, or between 30 minutes and 2 hours, or between 45 minutes and 90 minutes, e.g. the oxidation step is performed for 1 hour.

The effective time periods for the oxidation step depend on some of the other oxidation parameters, in particular the temperature and oxidation atmosphere. At high temperatures and/or in highly oxidising atmospheres, shorter time periods may be effective. Preferably a time period is used that is sufficient to remove the unwanted impurities from the char product, e.g. the carbon-based impurities, particularly the carbon-based polymer decomposition products resulting from the pyrolysis process.

The oxidation step is performed by heating the char material in an oxidising atmosphere. This atmosphere can be any oxidising gas and is preferably an oxidising gas which effectively reacts with carbon-based materials to give gaseous products. In preferable aspects of the present methods oxygen-containing gas is used, e.g. a blend of oxygen with other carrier gas. In most preferred aspects and for economic reasons air is used. In some cases air may be mixed with an inert carrier gas, e.g. nitrogen, argon or other suitable non-oxidative carrier gas.

Typically the oxidation step takes place by admitting the oxidising atmosphere (e.g. air) into the reaction chamber which is held at elevated temperature (as set out herein). The oxidising atmosphere is preferably at atmospheric pressure.

In some preferred cases, the oxidising atmosphere may flow through the reaction chamber, e.g. by pumping the gas into the chamber or pumping out exhaust gases. Such a flow of gas through the chamber may replenish the supply of oxidising atmosphere and help to remove gaseous products (e.g. carbon monoxide and/or dioxide). Such a flow of the oxidising gas through the reaction chamber may improve the efficiency of the oxidising step and may reduce the time taken to complete the oxidation step.

The oxidation step preferably removes substantially all of the carbon-based impurities from the char product, e.g. at least 90 wt. % of the carbon-based compounds in the char are removed, preferably at least 95 wt. %, more preferably at least 98%, preferably at least 99 wt. %, preferably at least 99.5 wt. %. In some most preferred aspects the carbon-based materials are removed entirely.

In some aspects, the char material may contain about 5-10 wt. % carbon black (from the initial tyre tread composition) and up to about 15 wt. % carbon-based residues from the pyrolysis of the polymer part of the rubber composition. Therefore, the oxidation step preferably removes at least the up to about 15 wt. % carbon-based residues from the pyrolysis of the polymer and preferably also removes the up to about 10 wt. % carbon black.

The present methods may be batch processes or continuous feed processes. In particular the oxidation step itself may be either a batch process or a continuous feed process regardless of the rest of the procedure, e.g. the pyrolysis step.

In preferred methods the yield of silica reclaimed from a silica-containing rubber composition feedstock may be at least about 60% of the silica in the feedstock rubber, preferably at least 70%, preferably at least 80%, preferably at least 90%, more preferably at least 95%.

The present proposals also relate to a silica-containing product obtained by the methods described herein. The silica-containing products obtained by these methods typically behave in a very similar way, and preferably indistinguishably from, non-reclaimed silica, at least in terms of performance as a component of rubber compositions and in particular vehicle tyre rubber compositions.

The reclaimed silica-containing product obtained following the oxidation step of the present methods (i.e. the direct product of the oxidation step) typically comprises at least 75 wt. % silica. In preferred aspects the silica product contains at least 75 wt. %, or at least 80 wt. %, or at least 85 wt. %, or at least 90 wt. %, or at least 95 wt. % silica. The other components in the reclaimed silica product may include other inorganic materials preferably with zinc oxide forming the majority of the non-silica material. Other components of the silica-containing product, in addition to silica itself, may be zinc oxide, aluminium oxide and sulphur-containing compounds. In preferred aspects the level of organic, carbon-containing material in the silica product following the oxidation step is less than 5 wt. %, preferably less than 4 wt. %, or less than 3 wt. %, or less than 2 wt. %, or less than 1 wt. %, or less than 0.5 wt. %. In preferred aspects the silica product contains no carbon-based materials (e.g. no carbon materials detectable in a sample by EDX analysis).

The oxidation step typically removes essentially all carbon-based material from the char product obtained from the pyrolysis stage. In preferred aspects the oxidation step removes an amount of carbon material equivalent to at least 5 parts by weight per 100 parts by weight of polymer component (e.g. styrene-butadiene rubber component) in the original silica-containing rubber composition prior to the pyrolysis step. In preferred aspects this amount of carbon material that is removed is up to about 35 parts by weight per 100 parts by weight of rubber component and is preferably between about 5 and 20 parts by weight of carbon material per 100 parts by weight of rubber component.

A particular advantage of the silica-containing product that is obtained following the oxidation step is that it can be incorporated into rubber compositions, in place of the non-reclaimed silica component that is typically used in a new tyre. In preferred aspects the reclaimed silica product obtained using the present methods can be simply substituted for non-reclaimed silica in a silica-containing rubber composition, i.e. the amount of the reclaimed silica-containing product (obtained from the present methods) used is the same as that used in compositions incorporating non-reclaimed silica and the processing conditions required to form the rubber compositions are unchanged.

When the reclaimed silica-containing product from the methods described herein is incorporated into a rubber composition (e.g. at a level of up to 100, or up to 80, or up to 60 parts by weight per 100 parts by weight of rubber compound, or in other suitable amounts as described below), for example a vehicle tyre rubber composition, the resulting rubber performs in a similar way to a rubber composition using new, raw silica (i.e. non-reclaimed silica) incorporated in the same amount.

For example, basic physical properties and dynamic properties of the rubber composition containing the reclaimed silica-containing product are preferably all better than 60% of the values for a rubber composition using new raw silica. More preferably the physical properties and dynamic properties are all better than 70% of the values for the rubber composition incorporating new, raw, silica, more preferably better than 80%, more preferably better than 85%, more preferably better than 90%, more preferably better than 95%, more preferably better than 98%. The relevant physical properties and dynamic properties may include Shore A hardness, modulus (e.g. M100% and/or M300%) tensile strength (TS), tear strength, compression set, abrasion resistance, elastic modulus (E'), loss modulus (E") and tan δ.

In particularly preferred cases at least the Shore A hardness, modulus (M300% and/or M100%) TS and E' measurements are better than 70% of those of a comparable rubber composition incorporating new, raw silica (i.e. non-reclaimed silica) and are preferably greater than 80%, greater than 90%, preferably greater than 95%, most preferably greater than 98%. Traditionally when known carbon black fillers are incorporated into rubber compositions it is not possible to reclaim the carbon black material of a sufficient quality to re-use in compositions without a large loss in performance of the resultant composition, e.g. some of the physical and dynamic properties mentioned above having values significantly less than 60% of rubber compositions using a comparable non-reclaimed carbon black material. Therefore this ability to reclaim the silica-containing product and re-use it in a rubber composition without significant loss in performance is one of the major benefits of the present proposals.

This ability to re-use the reclaimed silica-containing product in rubber compositions (e.g. vehicle-tyre rubber compositions) may in some cases be enhanced by the minor non-silica impurities in the reclaimed silica-containing product obtained from the methods described herein. For example these impurities may contain components which are commonly added to rubber compositions (e.g. compounding additives), so these may still act in the same way to improve the properties of the reclaimed silica-containing product. In certain scenarios this may mean that the reclaimed silica-containing product is in fact commercially more straightforward to use in rubber compositions because some of the compounding ingredients (zinc oxide for example) may already be present so these do not have to be added separately to the compositions.

The present proposals also relate to rubber compositions containing a silica-containing product obtained by the methods described herein. For example the silica-containing product may be present in the rubber composition in an amount of up to 100, or up to 80, or up to 70, or up to 60, or up to 50, or up to 40, or up to 30, or up to 20, or up to 10 parts by weight per 100 parts by weight of rubber compound. Preferably the silica-containing product is present in an amount of between 20 and 80 parts by weight, preferably between 30 and 70 parts by weight, preferably between 50 and 70 parts by weight, more preferably about 60 parts by weight, per 100 parts by weight of rubber compound.

The present methods are generally applicable to rubber compositions and feedstocks that incorporate silica in significant quantities, e.g. as a filler or reinforcing agent. In particular the methods are applicable to vehicle tyre compositions and especially vehicle tyre tread compositions. The starting compositions that can be processed by the methods according to the present proposals, preferably contain at least 10 wt. % silica preferably at least 20 wt. %, preferably at least 25 wt. %, more preferably at least 30 wt. %. Preferred starting compositions typically contain relatively smaller amounts of carbon black, such as less than 20 wt. %, preferably less than 10 wt. %, preferably less that 8 wt. %, preferably less than 5 wt. %. In preferred situations the starting material preferably contains a larger amount of silica than carbon black material. For example the amount of silica in the starting rubber composition is preferably at least 3 times the amount of carbon black present (as measured by weight %), preferably at least 5 times, preferably at least 7.5 times, preferably at least 10 times the amount of carbon black (as measured by weight %).

Any of these absolute and/or relative amounts of silica and carbon black in the starting material can mean that the carbon portion of the char product resulting from the pyrolysis step can be effectively removed from the char material to leave the desired silica-containing product. Larger amounts of carbon in the char product can mean that the step of heating in an oxidising atmosphere can take longer or require more extreme oxidising conditions to remove the carbon from the silica-containing product.

For the avoidance of any doubt it is confirmed that in the general description herein proposals of different general preferences and options in respect of different features of the methods and products constitutes the proposal of general combinations of those preferences and options for the different features, insofar as they are combinable and compatible and are put forward in the same context.

EXAMPLES

The following examples and experimental details are provided as exemplification of the methods and proposals herein and do not limit the scope of the proposals.

Pyrolysis

Rubber compositions were prepared by finely dividing the compositions into ~10 mm chips prior to the pyrolysis step.

Where the rubber compositions were derived from vehicle tyres, other tyre components (e.g. tyre cords, wires, beads etc.) were removed prior to dividing into chips so that only the rubber composition was used as the feedstock for the present methods.

Typically, 50 to 100 g of the divided rubber composition feedstock was placed in a reaction chamber. A conventional pyrolysis was performed in a sealed reaction chamber under inert atmosphere (nitrogen) at a temperature of 550° C. for a time of 8 hours.

The resulting "char" product was used as the starting material for the subsequent steps such as the heating under an oxidising atmosphere.

Preparation of Rubber Samples

Generic vehicle tyre rubber compositions were made incorporating silica (either fresh, non-reclaimed silica or reclaimed silica-containing product obtained from the methods described in the examples) as set out in table 1 below.

TABLE 1

| Ingredient | Parts per hundred rubber (phr) by weight |
|---|---|
| SBR 1502 (styrene-butadiene-rubber) | 100 |
| Silica | 60 |
| Liquid silane | 0 or 4 |
| TDAE Oil (Treated Distillate Aromatic Extract) | 10 |

TABLE 1-continued

| Ingredient | Parts per hundred rubber (phr) by weight |
|---|---|
| Zinc oxide | 5 |
| Stearic acid | 2 |
| 6PPD (N-(1,3-dimethylbutyl)-N'-phenyl-p-phenylenediamine) | 1.5 |
| TBBS (N-tert-butyl-2-benzothiazole sulphenamide) | 1.5 |
| Sulphur | 1.5 |

Two compositions were used; one without silane and one with 4phr silane. Compounds were produced using a 60 cc Brabender internal mixer set at 40° C. and 60 rpm.

Rubber Testing

Moving die rheometer (MDR) testing at 170° C. was used to assess the cure characteristics of each compound to allow preparation of 150×150×1.5 mm sheets using a cure time of T90+5 minutes (t90 is the time to 90% cure. Tensile, Shore A hardness and dynamic properties were then determined. Strain sweeps were conducted in tension at 40° C., 10 Hz and double strain amplitude (DSA) of ~0.06 to 6%. Temperature sweeps (10 Hz, 0.11% DSA, −80 to +80° C.) were also conducted on the compounds containing silane.

Optical microscopy was utilised to assess the levels of filler dispersion within each compound.

Energy dispersive X-ray analysis (EDX) was conducted on the reclaimed silica samples to verify their composition. Specimens were mounted onto carbon sticky tabs and analysed at 15 keV accelerating voltage over a livetime of 200 seconds.

Example 1

The char product from the pyrolysis step was heated at 600° C. for a period of 1 hour in air at atmospheric pressure by admission of air into the pyrolysis reaction chamber after attaining the desired 600° C. temperature to give, on cooling, the reclaimed silica-containing product. This silica-containing product was then incorporated into generic vehicle tyre rubber compositions and tested as noted above.

Two compositions were formed using the generic vehicle tyre rubber composition set out in table 1 above. Both used 4phr of silane and Ultrasil® VN2 silica as the silica component. Both were formed into rubber sheets (150×150×1.5 mm). One sheet was then chipped and subjected to the pyrolysis step (as outlined above) followed immediately by the heating in air at 600° C. for 1 hour as set out above to give a reclaimed silica-containing product. This reclaimed silica-containing product was then used as the silica component ("Reclaimed VN2 silica") in a generic vehicle tyre rubber composition set out in table 1 above (again with 4phr of silane) and formed into a cured sheet (150×150×1.5 mm).

The two rubber sheets were then tested as described above (under "Rubber Testing"). The results are presented in Table 2.

TABLE 2

| | Fresh, non-reclaimed VN2 silica | Reclaimed VN2 silica |
|---|---|---|
| Physical properties | | |
| Shore A (°) | 65 | 63 |
| M100% (MPa) | 2.7 | 2.3 |

TABLE 2-continued

|  | Fresh, non-reclaimed VN2 silica | Reclaimed VN2 silica |
|---|---|---|
| M300% (MPa) | 11.3 | 9.5 |
| TS (MPa) | 22.2 | 20.6 |
| EB (%) | 505 | 524 |
| Strain Sweep Properties | | |
| $E'_0$ (MPa) | 17.81 | 13.73 |
| $E'^\infty$ (MPa) | 7.13 | 6.30 |
| $\Delta E'$ (MPa) | 10.68 | 7.43 |
| E" max (MPa) | 2.13 | 1.58 |
| Tan δ max | 0.20 | 0.17 |

Shore A = hardness
M100/300 = stress at these elongations (referred to as modulus at these % strains
TS = tensile strength
EB = elongation at breaking
E' = elastic modulus
E" = loss modulus
tan δ = E"/E'

Figure 1:
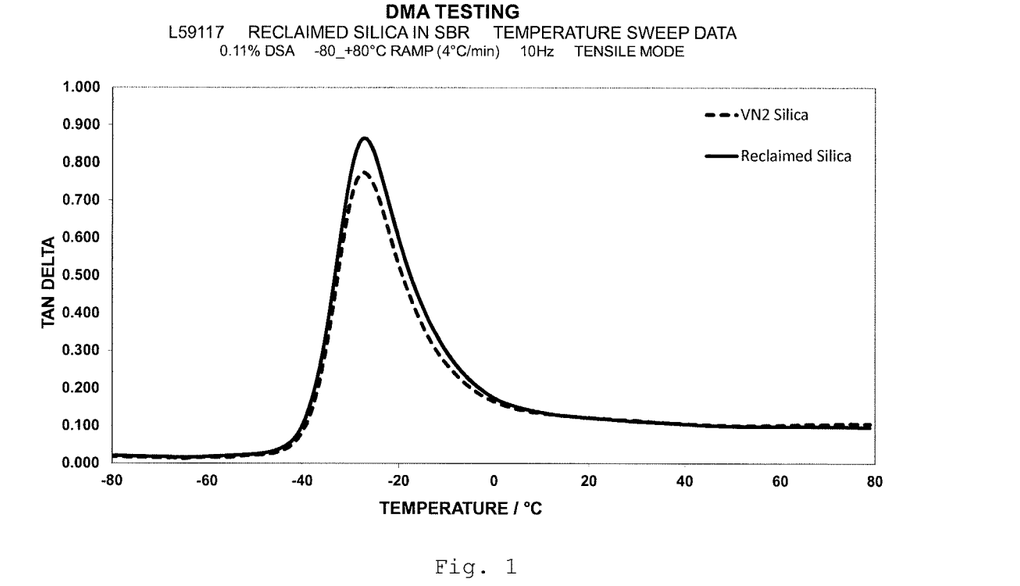
FIG. 1 shows Tan δ values as a function of temperature for rubber compositions containing Ultrasil® VN2 silica and reclaimed silica-containing product as outlined in Example 1.
Figure 2:
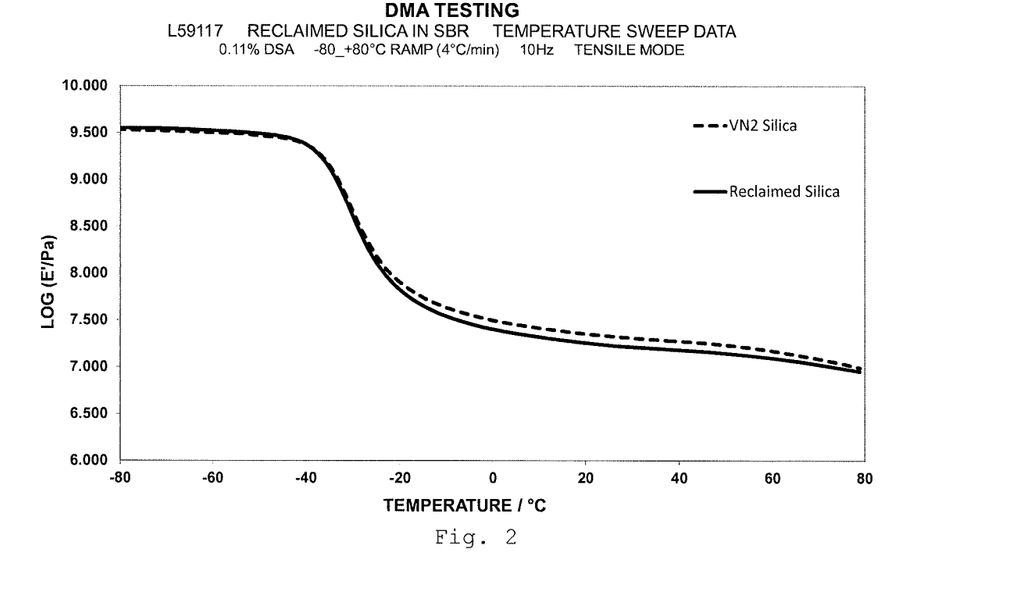
FIG. 2 shows E' values as a function of temperature for rubber compositions containing Ultrasil® VN2 silica and reclaimed silica-containing product as outlined in Example 1.

The reclaimed silica-containing product resulted in slightly reduced filler-filler interactions over the non-reclaimed material (reduced ΔE'). The presence of impurities such as the zinc oxide in the reclaimed silica-containing product will likely have contributed to this. The lower value of high strain elastic modulus (E' ∞) indicates a slight reduction in filler-polymer interactions, as suggested by the reduction in hardness. The reclaimed silica-containing compound had a tan δ max value ~15% lower than the non-reclaimed material, indicating reduced energy losses. The temperature dependency of the rubber composition incorporating reclaimed silica-containing product closely matched the non-reclaimed material compound (FIGS. 1 and 2), suggesting the process steps will not adversely affect properties such as wet traction.

Figure 3:
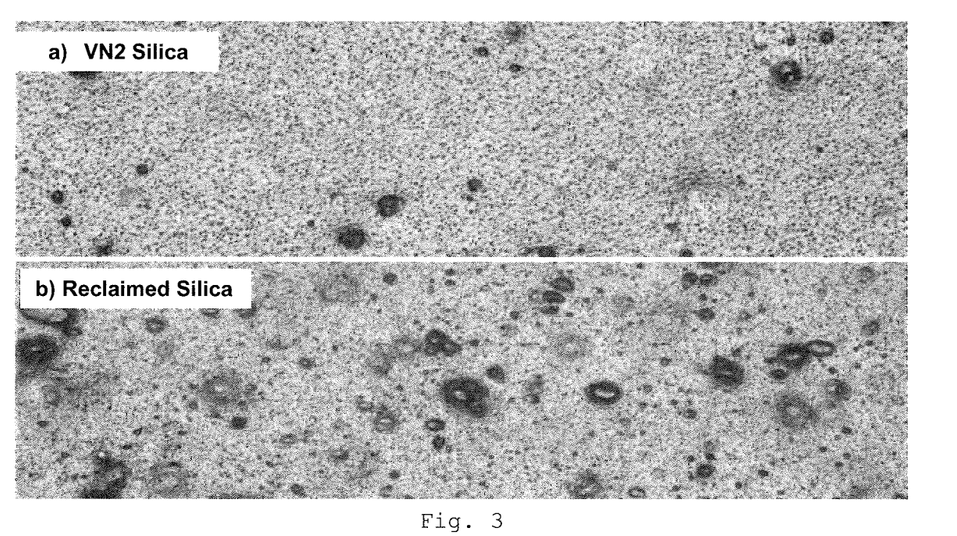
FIG. 3 shows optical microscopy images at 10× magnification for rubber compositions containing Ultrasil® VN2 silica and reclaimed silica-containing product as outlined in Example 1. Part a) shows the rubber containing Ultrasil® VN2 silica and part b) shows the rubber containing reclaimed silica-containing product.

FIG. 3 shows optical microscopy images at 10× magnification of the two rubber compositions. Part a) shows the rubber containing the Ultrasil® VN2 silica and part b) shows the rubber containing the reclaimed silica-containing product. It can be seen that the reclaimed silica product is incorporated slightly less homogeneously than the non-reclaimed silica into the rubber composition. This is thought to be a contributing factor to the slightly different performance of the reclaimed silica-containing product.

Figure 4:
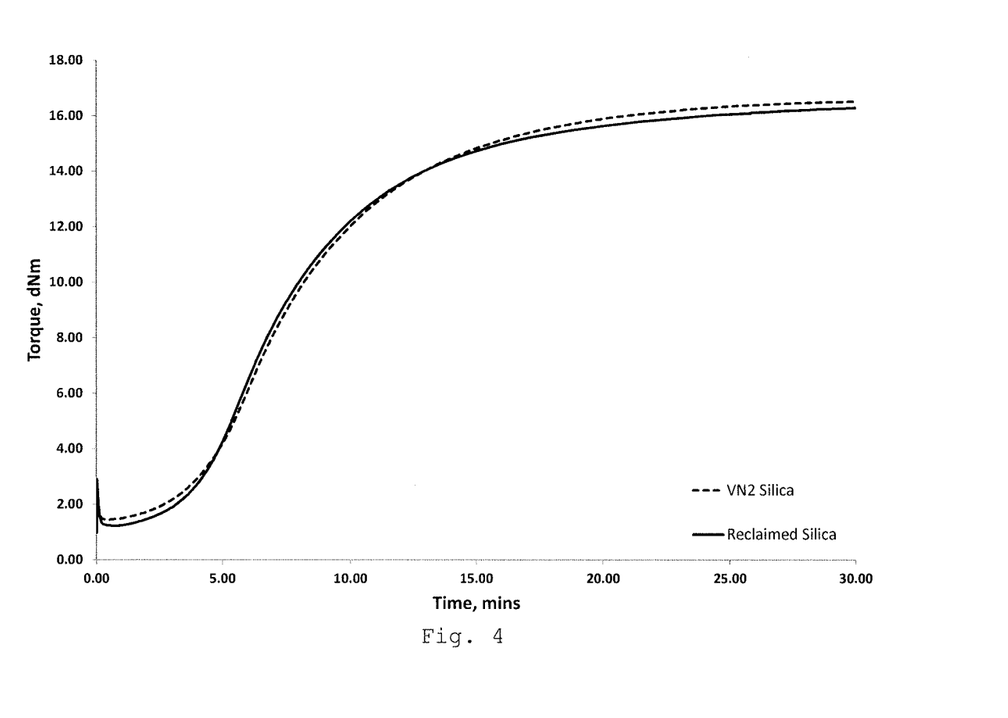
FIG. 4 shows the MDR plot of performance of the reclaimed silica-containing product compared to the Ultrasil® VN2 silica when incorporated into a generic vehicle tyre rubber composition.

FIG. 4 shows the MDR plot of performance of the reclaimed silica-containing product compared to the Ultrasil® VN2 silica when incorporated into a generic vehicle tyre rubber composition.

Figure 5:
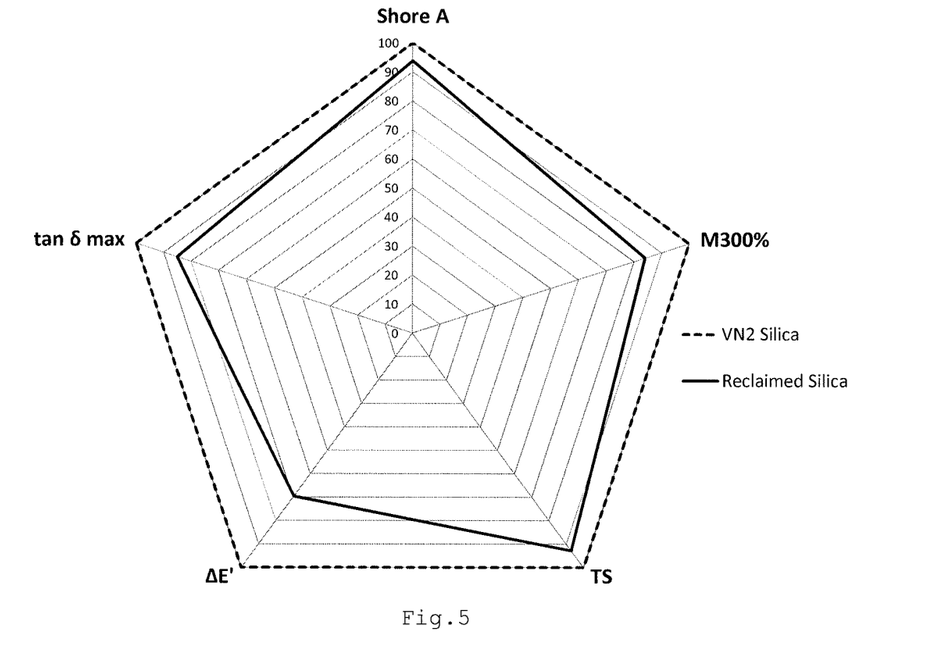
FIG. 5 shows a plot of performance of the reclaimed silica-containing product compared to the Ultrasil® VN2 silica when incorporated into a generic vehicle tyre rubber composition.
Figure 6:
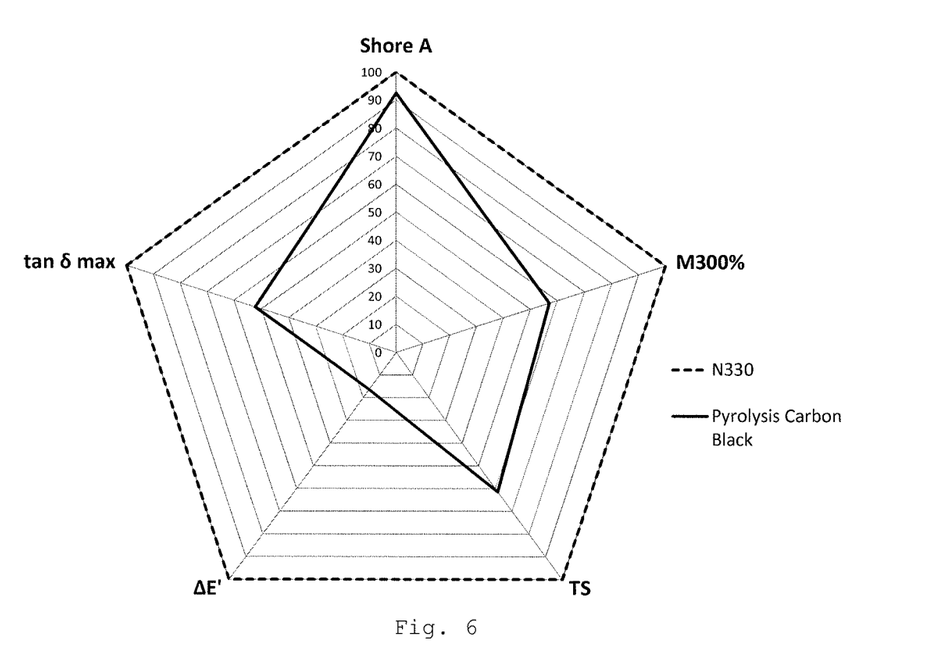
FIG. 6 shows a comparable plot of the performance of pyrolysis carbon black reclaimed using known methods as compared to fresh non-reclaimed carbon black material ("N330") in a generic vehicle tyre rubber composition.

FIG. 5 shows a plot of performance of the reclaimed silica-containing product compared to the Ultrasil® VN2 silica when incorporated into a generic vehicle tyre rubber composition. FIG. 6 shows a comparable plot of the performance of pyrolysis carbon black reclaimed using known methods as compared to fresh non-reclaimed carbon black material ("N330"). It can be seen that the silica-containing product reclaimed using the present methods performs much more closely to the non-reclaimed silica than the reclaimed carbon black does to the non-reclaimed carbon black when incorporated into generic vehicle tyre rubber compositions.

Example 2

Two compositions were formed as in Example 1 but instead of using Ultrasil® VN2 silica (which has a statistical surface area, STSA, of 130 m²/g), a higher surface area silica Ultrasil® VN3 was used which has a surface area of 180 m²/g.

Testing was performed as for the compositions in Example 1.

The two rubber sheets were then tested as described above in Example 1. The results are presented in Table 3.

TABLE 3

|  | Fresh, non-reclaimed VN3 silica | Reclaimed VN3 silica |
|---|---|---|
| Physical properties | | |
| Shore A (°) | 69 | 65 |
| M100% (MPa) | 2.30 | 2.08 |
| M300% (MPa) | 7.76 | 7.86 |
| TS (MPa) | 26.3 | 24.3 |
| EB (%) | 656 | 634 |
| Strain Sweep Properties | | |
| $E'_0$ (MPa) | 20.90 | 16.06 |
| $E'^\infty$ (MPa) | 9.83 | 7.36 |
| $\Delta E'$ (MPa) | 11.07 | 8.70 |
| E" max (MPa) | 2.89 | 2.09 |
| Tan δ max | 0.20 | 0.19 |

As noted for Example 1, The reclaimed silica-containing product resulted in slightly reduced filler-filler interactions over the fresh, non-reclaimed material (reduced ΔE'). The presence of impurities such as the zinc oxide in the reclaimed silica-containing product will likely have contributed to this. The lower value of high strain elastic modulus (E' ∞) indicates a slight reduction in filler-polymer interactions, as suggested by the reduction in hardness. The present method is applicable to recovery of high surface area VN3 silica in a similar way to the recovery of the lower surface area VN2 silica mentioned in Example 1.

Figure 7:
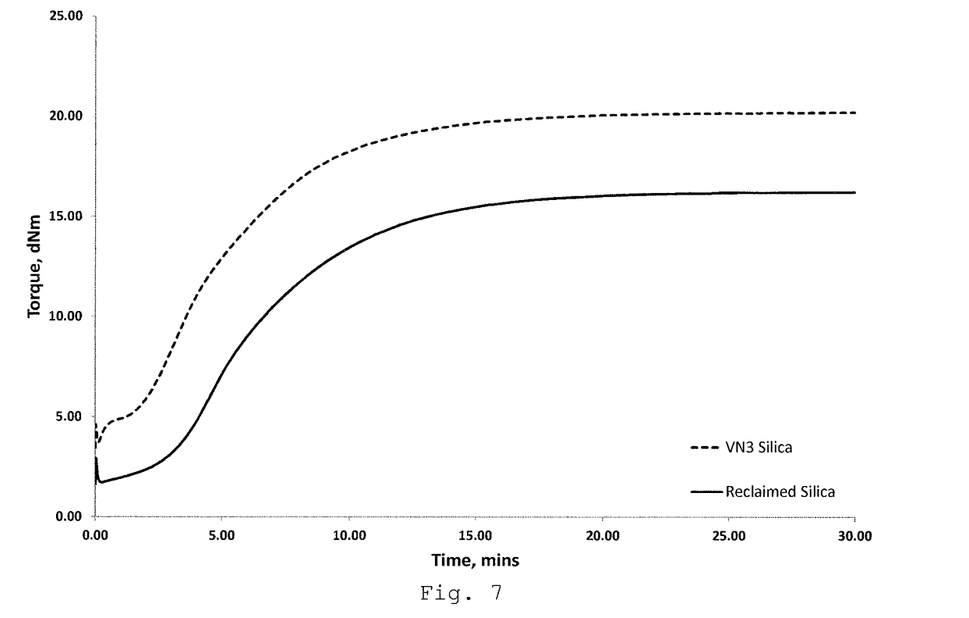
FIG. 7 shows the MDR plot of performance of the reclaimed silica-containing product compared to the Ultrasil® VN3 silica when incorporated into a generic vehicle tyre rubber composition.

FIG. 7 shows the MDR plot of performance of the reclaimed silica-containing product compared to the Ultrasil® VN3 silica when incorporated into a generic vehicle tyre rubber composition.

Figure 8:
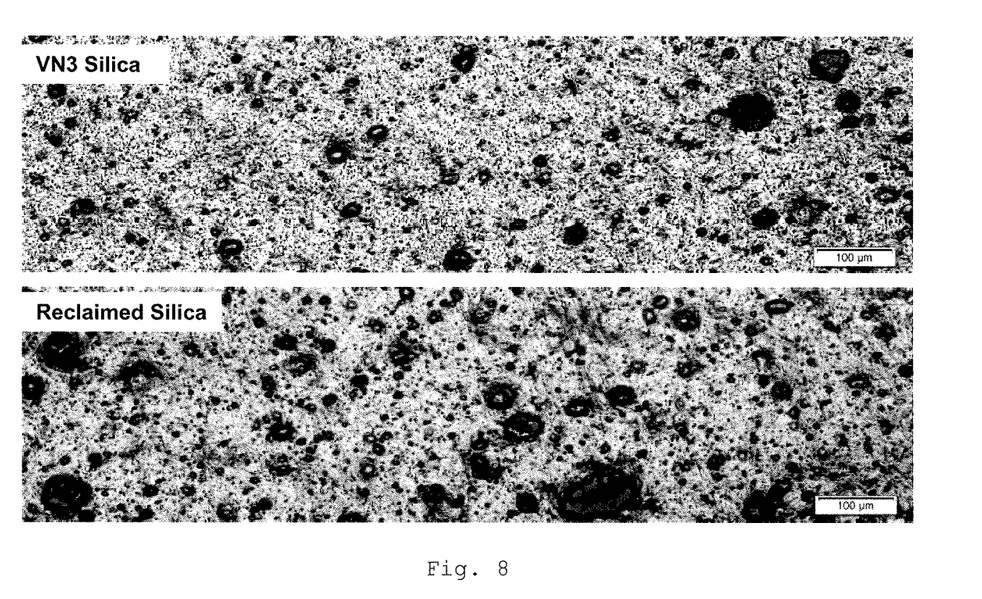
FIG. 8 shows optical microscopy images at 10× magnification of the two rubber compositions. The upper figure shows the rubber containing the Ultrasil® VN3 silica and the lower one shows the rubber containing the reclaimed silica-containing product.

FIG. 8 shows optical microscopy images at 10×× magnification of the two rubber compositions. The upper figure shows the rubber containing the non-reclaimed silica and the lower one shows the rubber containing the reclaimed silica-containing product. It can be seen that the reclaimed silica product is incorporated slightly less homogeneously than the non-reclaimed silica into the rubber composition. As for the lower surface area silica of Example 1, this is thought to be a contributing factor to the slightly different performance of the reclaimed silica-containing product.

Figure 9:
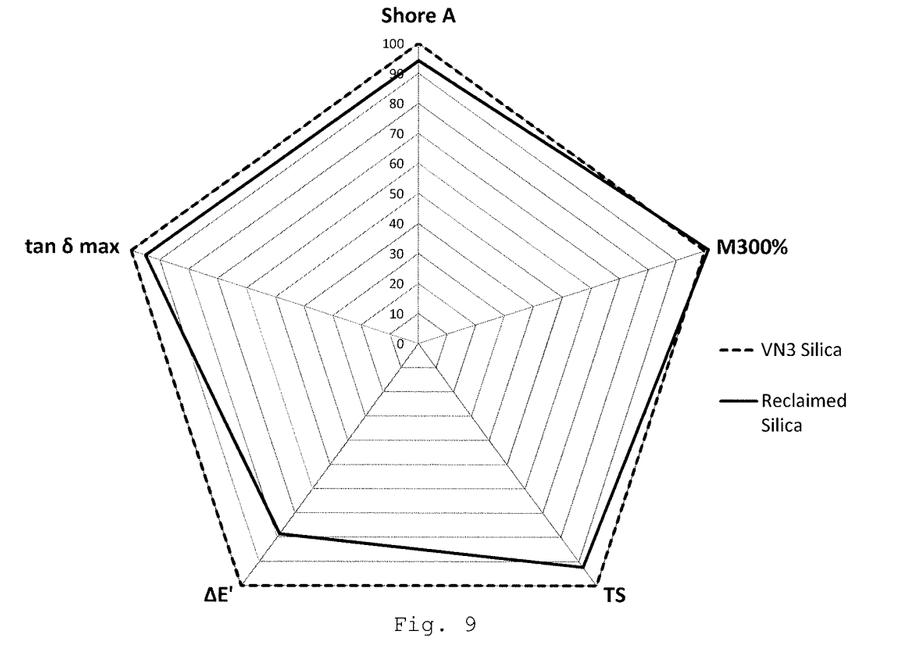
FIG. 9 shows a plot of performance of the reclaimed silica-containing product compared to the Ultrasil® VN3 silica when incorporated into a generic vehicle tyre rubber composition.

FIG. 9 shows a plot of performance of the reclaimed silica-containing product compared to the non-reclaimed Ultrasil® VN3 silica when incorporated into a generic vehicle tyre rubber composition. By comparison with FIG. 6, it can be seen that the silica-containing product reclaimed using the present methods performs much more closely to the non-reclaimed silica than the reclaimed carbon black does to the non-reclaimed carbon black when incorporated into generic vehicle tyre rubber compositions. It can also be seen that the reclaimed VN3 high surface area silica seems to perform more analogously to the fresh non-reclaimed VN3 silica than does the reclaimed lower surface area VN2 silica to the fresh non-reclaimed VN2 silica (as demonstrated by comparison with Example 1).

Example 3

The present methods as described in Example 1 were applied to a series of current commercial vehicle tyre tread rubber compositions from European passenger tyres (A-F) and the resultant silica product was assessed.

For each tyre sample, the rubber composition was processed according to the method described in Example 1. The resultant silica-containing product was then analysed by EDX as explained in the "Rubber Analysis" section above. The results are presented in Table 4 below.

TABLE 4

Reclaimed Silica-containing Composition (wt. %)

| Element | Tread A | Tread B | Tread C | Tread D | Tread E | Tread F |
|---|---|---|---|---|---|---|
| Si | 45.3 | 46.7 | 48.1 | 46.8 | 45.0 | 47.3 |
| O | 49.7 | 49.9 | 49.0 | 50.3 | 49.9 | 48.4 |
| Zn | 3.4 | 2.4 | 1.1 | 1.3 | 3.0 | 3.2 |
| Al | 1.3 | 0.5 | 0.8 | 0.8 | 1.0 | 0.6 |
| S | 0.4 | 0.5 | 0.4 | 0.3 | 0.5 | 0.4 |

Table 4 demonstrates that a silica-containing product with a high content of silica can be obtained from vehicle tyre compositions using the methods of the present proposals. In these cases approximately 95% of the reclaimed product is silica with relatively low levels of other components, such as around 3% ZnO with some alumina and sulphur.

The amount of silica-containing product recovered from each tyre sample following the oxidation step is presented in Table 5 below as a weight percentage of the original starting rubber composition prior to pyrolysis.

TABLE 5

| Name | Recovered silica-containing product wt. % |
|---|---|
| Tread A | 31.0 |
| Tread B | 29.2 |
| Tread C | 29.9 |
| Tread D | 31.1 |
| Tread E | 31.0 |
| Tread F | 31.8 |

Example 4

The reclaimed silica-containing products obtained in Example 3 using the methods described in Example 1 were formulated into generic vehicle tyre rubber compositions using the composition as set out above under the heading "Preparation of Rubber Samples". For each starting tyre material A-F, a composition was formulated containing no silane component, i.e. 0phr silane in the generic composition described above.

Figure 10:
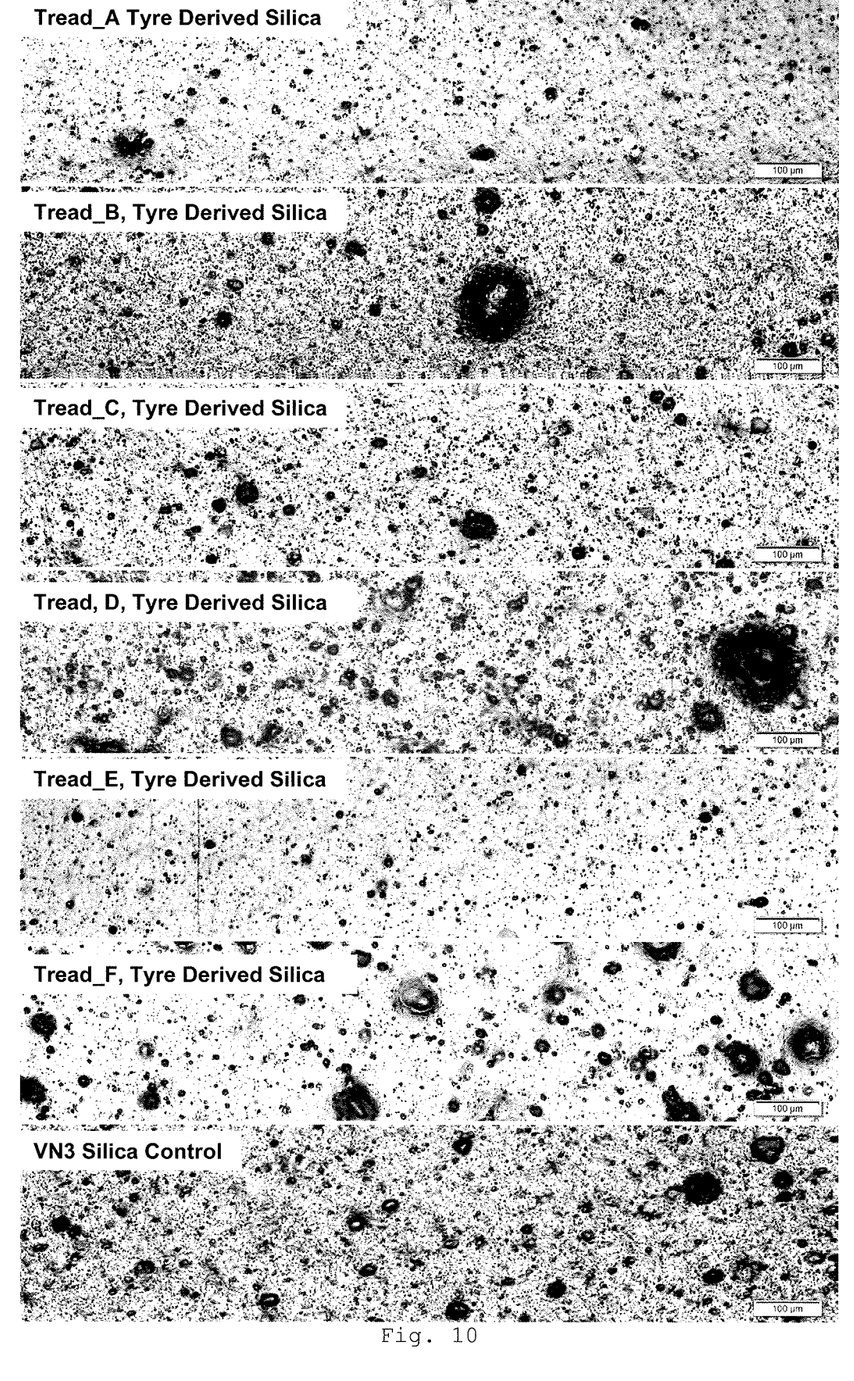
FIG. 10 shows optical microscopy images at 10× magnification of the rubber compositions (without silane component) incorporating Tyre Derived Silica (TDS) from six different commercially available tyres along with a control sample using Ultrasil® VN3 silica.

Dispersion of the reclaimed silica-containing product in the generic vehicle tyre rubber composition was assessed by optical microscope at 10× magnification as explained above. The results are show in FIG. 10. All of the dispersions were sufficient to form a useable vehicle tyre rubber composition with the samples A and E showing particularly good performance.

Rheology results from MDR testing and physical properties of the rubber compositions incorporating the silica-containing product reclaimed from each of the samples A-F are shown below in Table 6.

TABLE 6

Reclaimed silica-containing product in-rubber properties (tyres A to F)

| | A | B | C | D | E | F |
|---|---|---|---|---|---|---|
| MDR Data | | | | | | |
| Min Torque, dNm | 4.26 | 4.58 | 4.85 | 4.74 | 4.41 | 4.64 |
| Max Torque, dNm | 19.56 | 17.91 | 18.17 | 22.46 | 19.74 | 19.90 |
| Max – Min | 15.30 | 13.33 | 13.32 | 17.72 | 15.33 | 15.26 |
| Ts2 scorch time (min) | 0.33 | 2.73 | 0.26 | 0.33 | 0.30 | 0.32 |
| T90 cure time (min) | 23.45 | 19.06 | 18.17 | 18.87 | 19.74 | 22.48 |
| Physical Properties | | | | | | |
| Shore A | 60 | 61 | 62 | 62 | 55 | 60 |
| M100%, MPa | 1.05 | 1.13 | 1.05 | 1.17 | 0.89 | 0.98 |
| M300%, MPa | 1.54 | 2.53 | 1.93 | 2.48 | 1.27 | 1.86 |
| TS, MPa | 12.6 | 17.6 | 16.7 | 17.6 | 11.8 | 15.5 |
| EB, % | 1100 | 932 | 968 | 936 | 1130 | 1060 |

All of the compounds have reasonable hardness levels however low polymer-filler interactions in these compositions without the silane component is demonstrated by the relatively low M100% and M300% values and the high elongation to break.

Figure 11:
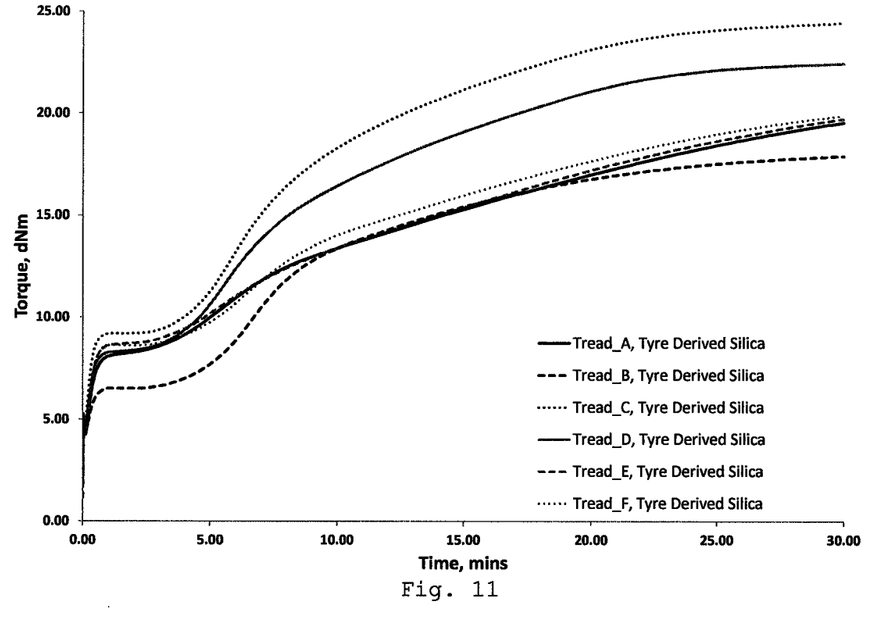
FIG. 11 shows the MDR curves.
Figure 12:
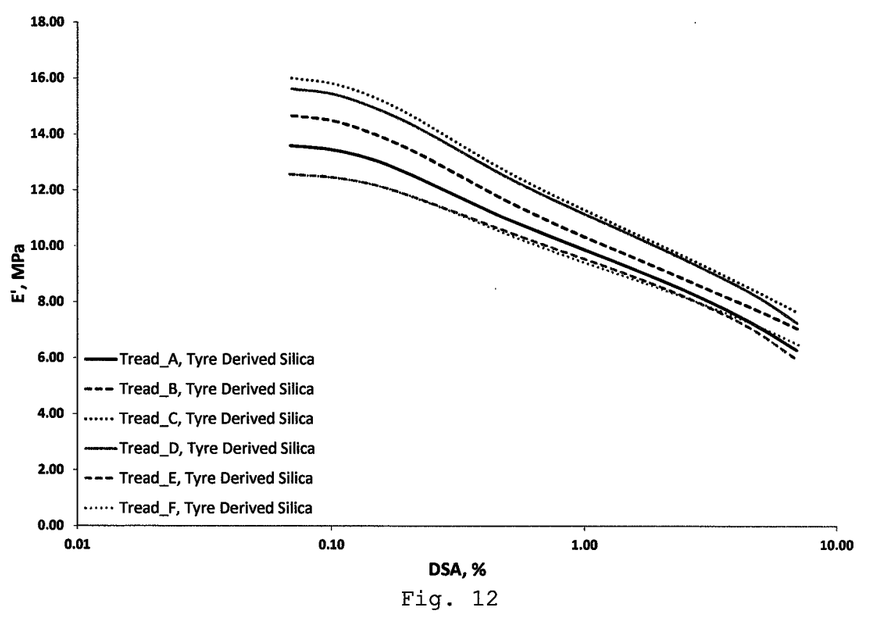
FIG. 12 shows elastic modulus results.
Figure 13:
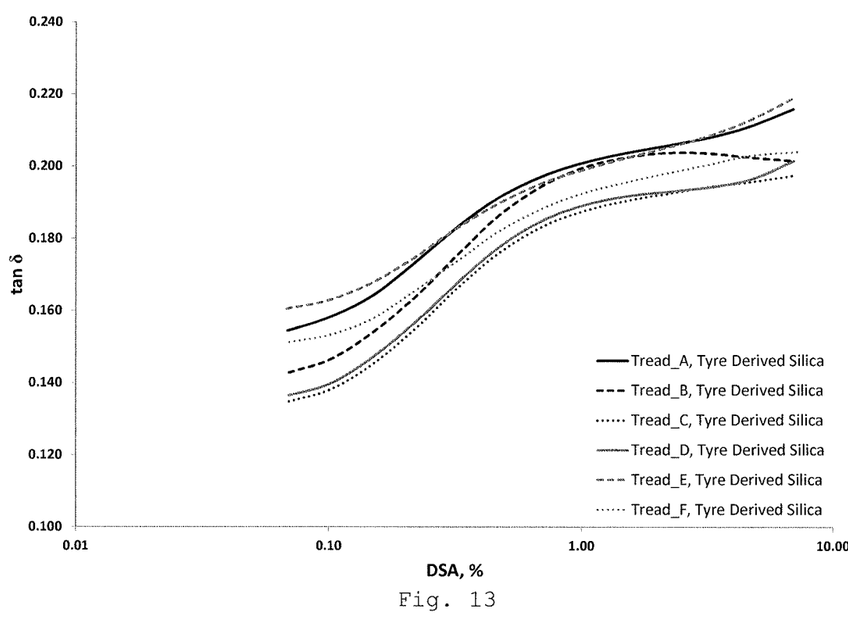
FIG. 13 shows tan δ results.

FIGS. 11-13 show the cure and dynamic properties of each of the rubber compositions incorporating the silica-containing product reclaimed from each of the tyre compositions A-F. FIG. 11 shows the MDR curves, FIG. 12 shows elastic modulus results, and FIG. 13 shows tan δ results. The elastic modulus results in FIG. 12 indicate relatively high levels of filler-filler interactions (i.e. interactions between the silica filler particles), as would be expected with the absence of the silane or other coupling agent. This is supported by relatively high tan δ values shown in FIG. 13.

Example 5

The reclaimed silica-containing products obtained in Example 3 using the methods described in Example 1 were formulated into generic vehicle tyre rubber compositions using the composition as set out above under the heading "Preparation of Rubber Samples". However, in these compositions, for each starting tyre material A-F, a composition was formulated containing 4phr silane component (as compared to 0phr silane in Example 4) in the generic composition described above.

Figure 14:
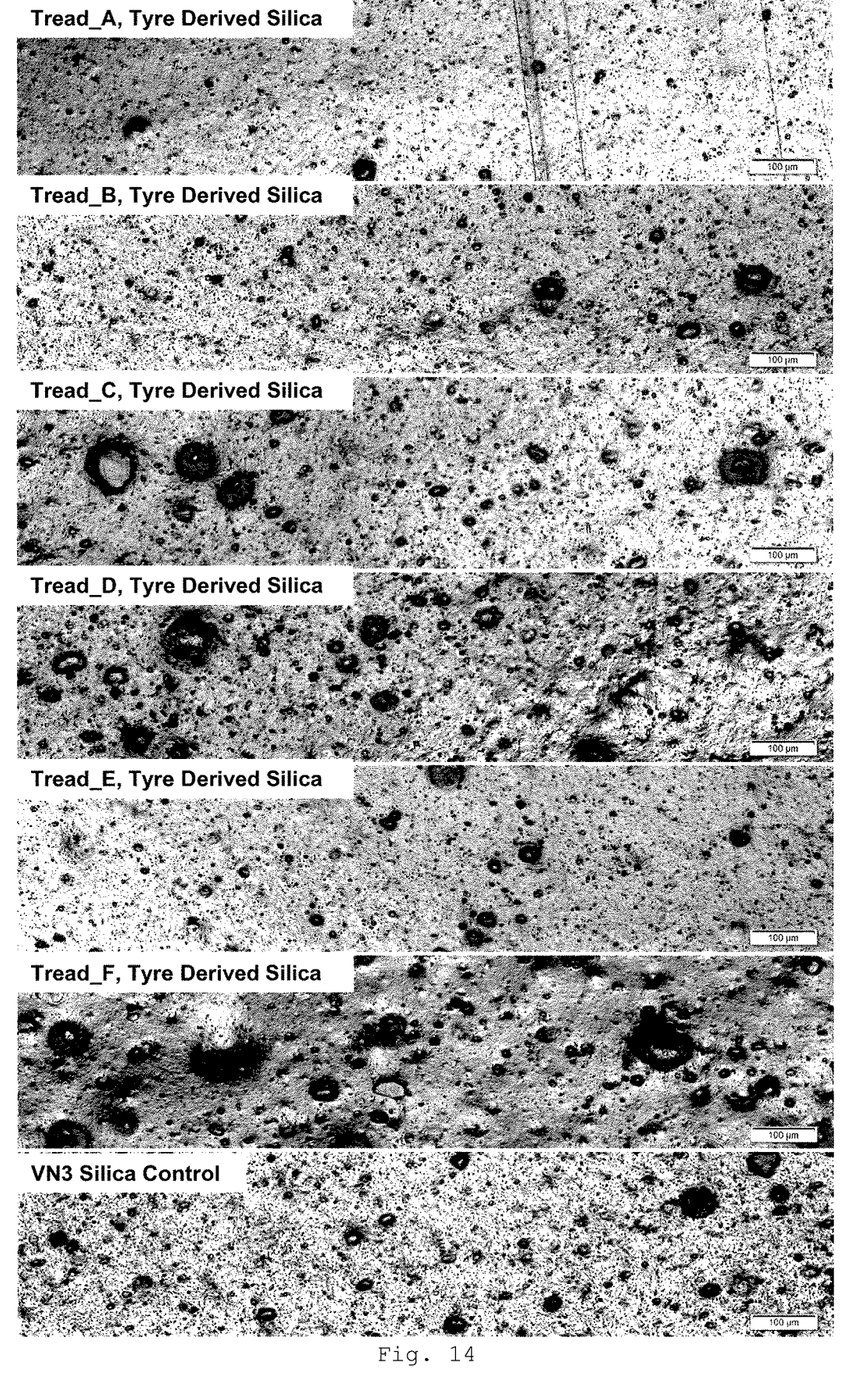
FIG. 14 shows optical microscopy images at 10× magnification of the rubber compositions (including 4phr silane) incorporating Tyre Derived Silica (TDS) from six different commercially available European passenger tyres along with a control sample using Ultrasil® VN3 silica.

Dispersion of the reclaimed silica-containing product in the generic vehicle tyre rubber composition was assessed by optical microscope at 10× magnification as explained above. The results are shown in FIG. 14. All of the dispersions were sufficient to form a useable vehicle tyre rubber composition with the samples A and E showing particularly good performance, possibly even showing improvement over the control sample incorporating VN3 silica.

Rheology results from MDR testing and physical properties of the rubber compositions incorporating the silica-containing product reclaimed from each of the samples A-F are shown below in Table 7.

TABLE 7

| | \multicolumn{7}{c}{Tyre Composition} |
|---|---|---|---|---|---|---|---|
| | A | B | C | D | E | F | VN3 |
| \multicolumn{8}{c}{MDR Data} |
| Min, dNm | 2.04 | 2.16 | 2.47 | 2.41 | 2.35 | 2.51 | 3.73 |
| Max, dNM | 16.42 | 15.82 | 17.09 | 16.99 | 16.60 | 17.00 | 20.21 |
| Max − Min | 14.38 | 13.66 | 14.62 | 14.58 | 14.25 | 14.49 | 16.48 |
| Ts2 (min) | 2.62 | 3.08 | 2.79 | 2.77 | 2.70 | 2.81 | 1.91 |
| T90 (min) | 8.89 | 9.59 | 9.43 | 8.11 | 10.22 | 10.12 | 10.65 |
| \multicolumn{8}{c}{Physical Properties} |
| Shore A | 68 | 68 | 72 | 70 | 69 | 70 | 69 |
| M100%, MPa | 2.13 | 2.23 | 2.62 | 2.56 | 2.32 | 2.44 | 2.30 |
| M300%, MPa | 10.9 | 11.4 | 13.6 | 12.9 | 11.8 | 10.9 | 7.76 |
| TS, MPa | 26.6 | 26.7 | 25.4 | 24.8 | 26.5 | 26.3 | 26.3 |
| EB, % | 526 | 538 | 499 | 472 | 488 | 544 | 656 |

All of the compounds have excellent hardness levels and modulus values. Slight differences between the samples may be associated with differences in surface area of the reclaimed silica-containing product. The inclusion of silane in the compositions significantly increased the filler-polymer interactions which increased the modulus and reduced the elongation to break compared to the compositions without silane shown in Example 4. This demonstrates that the silica component in the reclaimed silica-containing product can be silanised as per the virgin, non-reclaimed Ultrasil® VN3 silica, using conventional techniques.

Figure 15:
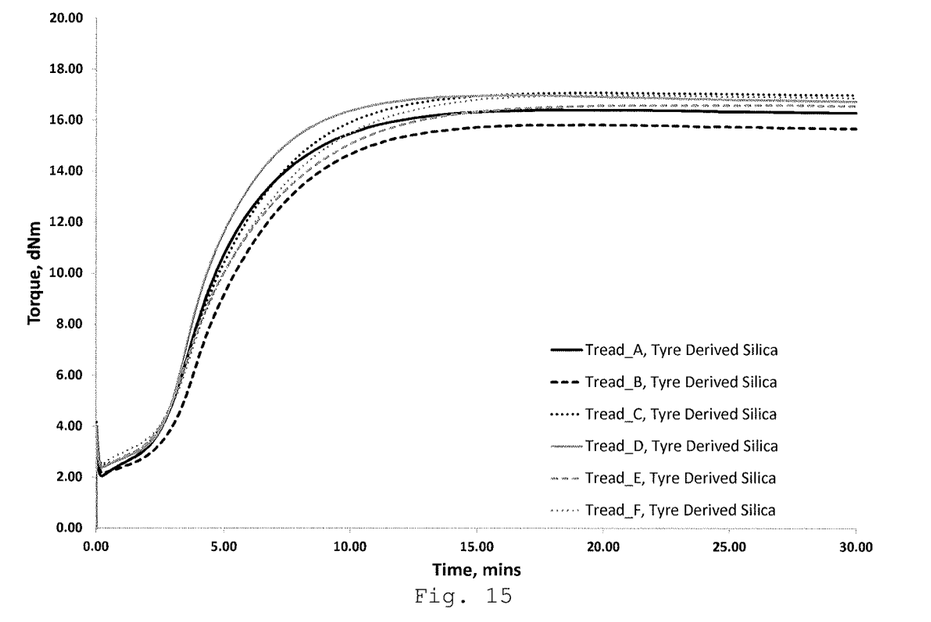
FIG. 15 shows the MDR curves.
Figure 16:
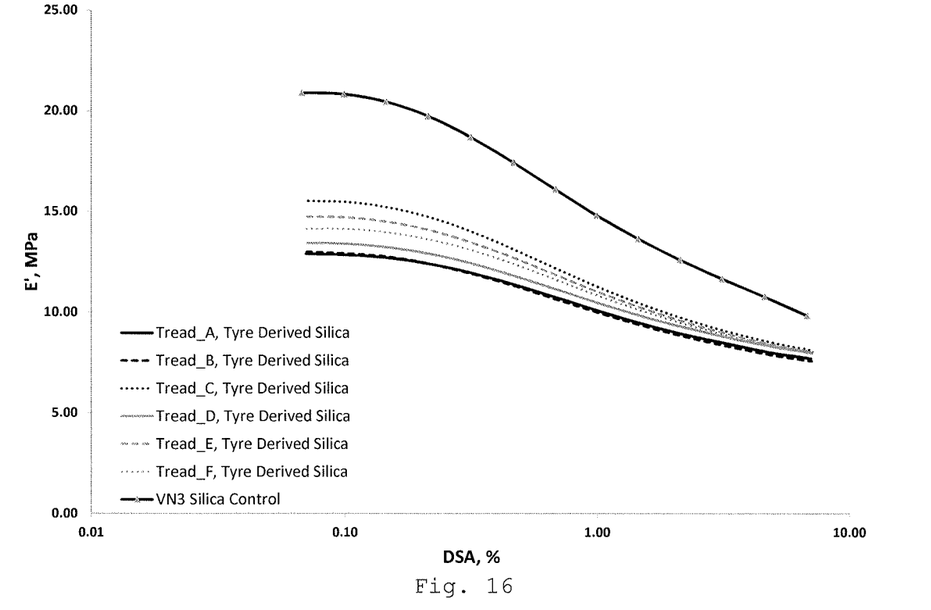
FIG. 16 shows elastic modulus results.
Figure 17:
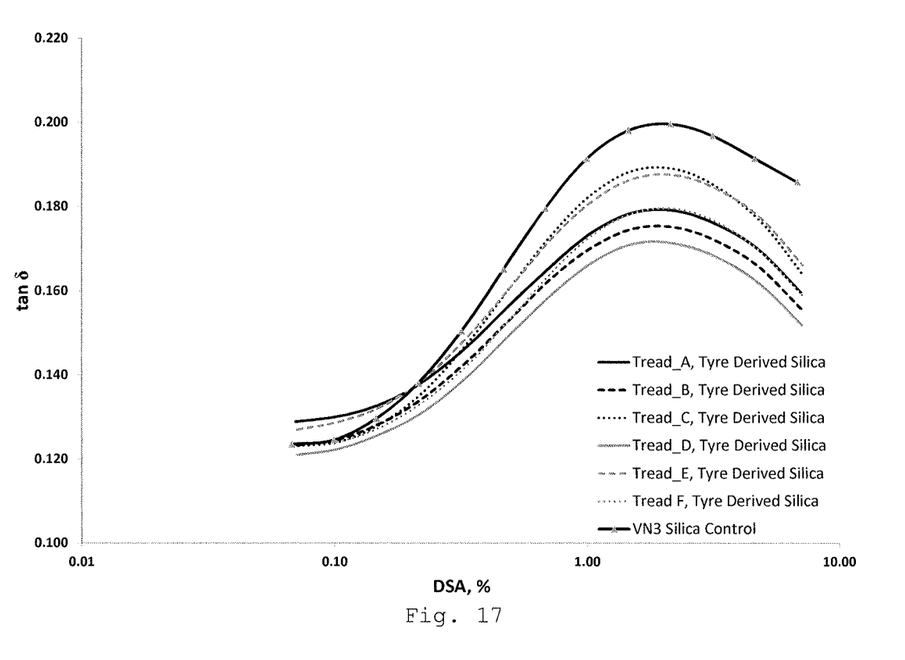
FIG. 17 shows tan δ results.

FIGS. 15-17 show the cure and dynamic properties of each of the rubber compositions incorporating the silica-containing product reclaimed from each of the tyre compositions A-F. FIG. 15 shows the MDR curves, FIG. 16 shows elastic modulus results, and FIG. 17 shows tan δ results. The shape of the MDR curves in FIG. 15 show the reclaimed silica-containing product filled compounds cure in a conventional manner. In the strain sweep data (FIGS. 16 and 17) filler-filler interactions and energy losses (ΔE' and tan δ max) are significantly reduced as a result of the silane coupling. The silane coupling reduces filler-filler interactions and increases filler-polymer interactions. The reclaimed silica-containing samples have superior properties to the VN3 control, with the reduced energy losses of the reclaimed silica-containing product potentially offering improved fuel efficiency when used in a tyre tread.

Temperature sweep experiments were also performed with E' and tan δ values showing that the compositions containing the reclaimed silica-containing product from samples A-F have relatively stable stiffness levels over the temperature range of −5 to +50° C.

The invention claimed is:

1. A method for removing carbon from a char product formed by heating a silica-containing rubber compound in an inert atmosphere or under vacuum, the method comprising heating the char product at a temperature of 500° C. to 800° C. in an oxidizing atmosphere to remove carbon material from it to give a silica-containing product.

2. A method for recovering a silica-containing product from a silica-containing rubber compound the method comprising the steps of:
heating the silica-containing rubber compound in an inert atmosphere or under vacuum to give a char product; and subsequently
removing carbon from the char product using a method according to claim 1 to give the silica-containing product.

3. A method according to claim 2, wherein the silica-containing rubber compound is vehicle tire rubber.

4. A method according to claim 1, wherein the oxidizing atmosphere is air.

5. A method according to claim 1, wherein the heating in an oxidizing atmosphere is carried out for between 15 minutes and 6 hours.

6. A method according to claim 1, wherein the heating in an oxidizing atmosphere is carried out at a temperature of between 500° C. and 700° C.

7. A method according to claim 1, wherein the step of heating in an oxidizing atmosphere removes substantially all of the carbon based material from the char product.

8. A method according to claim 2, wherein the amount of silica recovered from the silica-containing rubber compound is greater than 90% of the amount of silica in the starting silica-containing rubber compound.

9. A method according to claim 1, wherein the silica-containing product comprises at least 75% silica.

10. A method according to claim 1, wherein the amount of carbon material in the silica-containing product is less than 5% by weight.

* * * * *